United States Patent
Sultana et al.

(10) Patent No.: US 11,136,894 B2
(45) Date of Patent: Oct. 5, 2021

(54) CENTRAL SUPPORT FOR AUXILIARY TUBES WITH ELASTIC RETURN

(71) Applicant: SAFRAN AIRCRAFT ENGINES, Paris (FR)

(72) Inventors: Patrick Jean Laurent Sultana, Moissy-Cramayel (FR); Sebastien Jean Laurent Prestel, Moissy-Cramayel (FR); Olivier Renon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/496,368

(22) PCT Filed: Mar. 23, 2018

(86) PCT No.: PCT/FR2018/050707
§ 371 (c)(1),
(2) Date: Sep. 20, 2019

(87) PCT Pub. No.: WO2018/172715
PCT Pub. Date: Sep. 27, 2018

(65) Prior Publication Data
US 2021/0108526 A1    Apr. 15, 2021

(30) Foreign Application Priority Data
Mar. 23, 2017    (FR) ...................................... 1752420

(51) Int. Cl.
*F01D 9/06*    (2006.01)
*F01D 25/04*    (2006.01)
*F16L 3/13*    (2006.01)

(52) U.S. Cl.
CPC ............... *F01D 9/06* (2013.01); *F01D 25/04* (2013.01); *F16L 3/13* (2013.01); *F05D 2220/30* (2013.01);
(Continued)

(58) Field of Classification Search
CPC . F01D 9/06; F01D 9/065; F01D 25/04; F01D 25/162; F01D 25/164; F01D 25/26;
(Continued)

(56) References Cited

U.S. PATENT DOCUMENTS 5,284,011 A * 2/1994 Von Benken ............. F01D 5/26
60/796
6,769,867 B2 * 8/2004 Uematsu .................. F01D 5/081
415/115
(Continued)

FOREIGN PATENT DOCUMENTS

EP    0342087 A1    11/1989
EP    1291491 A2    3/2003
(Continued)

OTHER PUBLICATIONS

Khaja, S., Mehta, K.K., Veera Babu, R. et al. Mechanical Properties Anisotropy of Isothermally Forged and Precipitation Hardened Inconel 718 Disk. Metall Mater Trans A 46, 1140-1153 (2015). https://doi.org/10.1007/s11661-014-2706-2 (Year: 2014).*
(Continued)

*Primary Examiner* — Brian P Wolcott
(74) *Attorney, Agent, or Firm* — Womble Bond Dickinson (US) LLP

(57) ABSTRACT

The invention relates to a turbomachine assembly comprising: —a casing comprising: —an internal hub (10), —an external ferrule (20) extending around and at a distance from the internal hub (10), —a hollow arm (30), provided with a longitudinal cavity (40) and connecting the internal hub (10)
(Continued)

Figure 1:
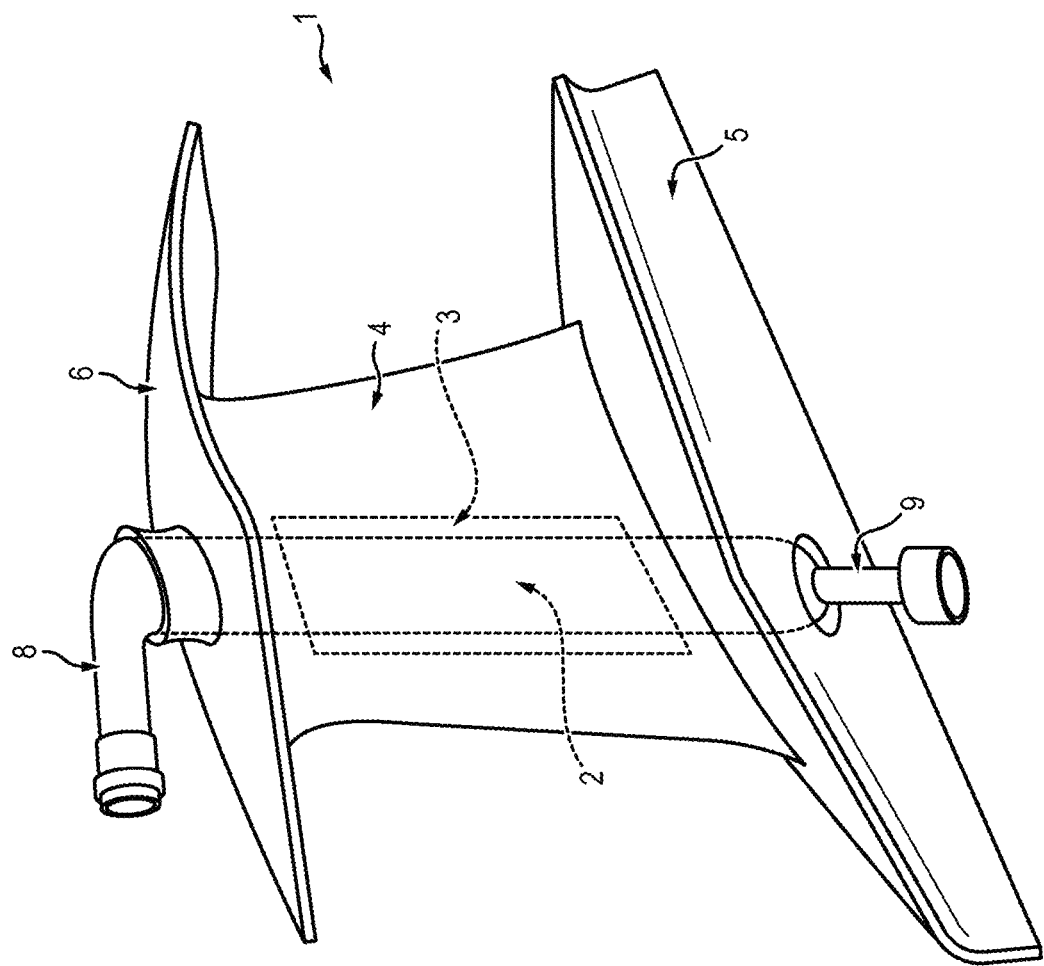

and the external ferrule (20), —a tube (50) configured to extend in the interior of the longitudinal cavity (40) of the hollow arm (30) of the casing and comprising a central support (60) comprising two elastic blades (61) and configured to exert a pressure on the wall (42) of the longitudinal cavity (40) when the tube (50) is extended in the interior of the longitudinal cavity (40); characterized in that the material(s) of the elastic blades (61) is (are) such that said elastic blades (61) have a stress curve between the minimum and maximum stress curves of table A.

11 Claims, 8 Drawing Sheets

(52) U.S. Cl.
 CPC ...... *F05D 2230/60* (2013.01); *F05D 2240/14* (2013.01)

(58) Field of Classification Search
 CPC .. F01D 25/28; F05D 2220/30; F05D 2240/14; F16L 3/00; F16L 3/08; F16L 3/12; F16L 3/16; F16L 3/1207; F16L 3/1218; F16L 3/1226; F16L 3/13
 See application file for complete search history.

(56) References Cited

U.S. PATENT DOCUMENTS

| | | | | |
|---|---|---|---|---|
| 9,863,278 | B2* | 1/2018 | Sultana | F01D 25/28 |
| 10,557,572 | B2* | 2/2020 | Banhos | F01D 25/04 |
| 10,871,077 | B2* | 12/2020 | Stoliaroff-Pepin | F01D 9/065 |
| 2016/0348520 | A1 | 12/2016 | Gaudry et al. | |
| 2018/0274389 | A1* | 9/2018 | Miller | F01D 25/18 |

FOREIGN PATENT DOCUMENTS

| | | |
|---|---|---|
| WO | 20141188122 A1 | 11/2014 |
| WO | WO-2015024800 A1 * | 2/2015 |

OTHER PUBLICATIONS

Publication No. SMC-045 Copyright © Special Metals Corporation, 2007 (Sep. 7); https://www.specialmetals.com/assets/smc/documents/inconel_alloy_718.pdf (Year: 2007).*
International Preliminary Report on Patentability received for PCT Patent Application No. PCT/FR2018/050707, dated Oct. 3, 2019, 13 pages (7 pages of English Translation and 6 pages of Original Document).
International Search Report and Written Opinion received for PCT Patent Application No. PCT/FR2018/050707, dated Jul. 4, 2018, 15 pages (7 pages of English Translation and 8 pages of Original Document).
Preliminary Research Report received for French Application No. 1752420, dated Nov. 21, 2017, 3 pages (1 page of French Translation Cover Sheet and 2 pages of original document).

* cited by examiner

US 11,136,894 B2

CENTRAL SUPPORT FOR AUXILIARY TUBES WITH ELASTIC RETURN

TECHNICAL FIELD

The invention relates to an assembly of turbomachine parts.

The invention concerns more specifically the structures with hollow arms found in turbomachines, as well as the pipes extending inside these hollow arms.

STATE OF THE ART

The operation of a conventional turbomachine involves the circulation of various fluids through said turbomachine. For example, these fluids can be air, oil, or oiled air.

In order to convey these fluids, it is known to have pipes in the very structure of the turbomachine. Some of these pipes must connect radially outer portions of the turbomachine to radially inner portions, and thus pass through the primary and secondary air flows. To do so, it is known to dispose these pipes, called auxiliary tubes, within hollow casing arms. For example, such tubes are found in the hollow arms of the downstream casing of a turbine, called TRF (Turbine Rear Frame). This example is however not limiting, since it is also possible to find such tubes in portions of turbomachines such as a TRV (downstream turbine rectifier or "Turbine Rear Vane"), a TCF (inter-turbine casing or "Turbine Center Frame") or a TVF (inter-turbine rectifier or "Turbine Vane Frame").

FIG. 1 illustrates an example of a turbomachine assembly 1 comprising a tube 2 disposed inside a longitudinal cavity 3 provided inside a hollow arm 4 connecting an inner hub 5 to an outer shroud 6 of the turbomachine casing.

As can be noticed in FIG. 1, it is known to introduce the tube 2 within the longitudinal cavity 3 of the hollow arm 4 at the junction between the hollow arm 4 and the outer shroud 6. The tube 2 is then slid inside the cavity 3 to extend completely therein. The ends 8, 9 of the tube 2 are then respectively fixed to the inner hub 5 and to the outer shroud 6 in order to secure the tube to the hub 5 and to the shroud 6. As a result, the tube ends 8, 9 are assembled to tubes comprised in hydraulic circuits disposed in radially outer or inner portions, so as to ensure a fluid communication between radially outer portions of the turbomachine and radially inner portions.

In FIG. 1, it is also visible that, over the majority of the length of the tube 2, the outer surface of the tube is not in contact with the wall of the longitudinal cavity 3. The tube 2 thus disposed is therefore free to vibrate.

However, the tube 2 has natural vibration frequencies. The tube 2 vibrates more violently when it is excited at these frequencies. This induces a rapid fatigue until break. These frequencies depend on the length of the tube 2, but also on the material that constitutes it, on its thickness, or on its temperature.

The longer the tube 2, the more the lowest natural frequency is small and close to the rotational frequencies of the low and high pressure spools of the turbomachine. This causes robustness and safety problems within the turbomachines. This is especially true in the case of large-sized engines.

It is therefore known to add a central bracket system, secured to the tube, disposed in a position substantially equidistant from both ends of the tube, so as to stabilize the tube within the hollow arm. This central bracket system generally has two complementary elastic blades disposed facing each other so as to provide the bracket with a double U-shaped orthogonal cross-section called "hurricane".

Such a central bracket has an orthogonal cross-section length greater than the longitudinal cavity width. It is therefore known to compress the central bracket when inserting the central portion of the tube within the longitudinal cavity, so as to allow the passage of the entire tube. Once inserted, the central bracket system relaxes to exert a pressure on the longitudinal cavity walls.

However, in the central bracket systems of the prior art, the relaxation of the central bracket observed is not sufficient to come into contact with the walls of the longitudinal cavity.

There is therefore a need for a turbomachine assembly comprising a tube disposed inside a longitudinal cavity of the hollow arm connecting an inner hub to an outer shroud and not having the disadvantages mentioned above.

BASIS OF THE INVENTION

An object of the invention is to provide a turbomachine assembly for conveying a fluid between two radially distant turbomachine portions in a robust and reliable manner.

Another object of the invention is to propose a turbomachine assembly which is easy to mount and thus which reduces the manufacturing and mounting costs.

Another object of the invention is to propose a turbomachine assembly suitable for large-dimensioned turbomachines.

In this respect, the invention proposes a turbomachine assembly comprising:
  a casing comprising:
    an inner hub,
    an outer shroud extending around and away from the inner hub,
    a hollow arm provided with a longitudinal cavity and connecting the inner hub and the outer shroud,
    a tube configured to extend inside the longitudinal cavity of the hollow arm of the casing and comprising a central bracket comprising two elastic blades and configured to exert a pressure on the longitudinal cavity wall when the tube is extended within the longitudinal cavity.
characterized in that the material(s) of the elastic blades is/are such that said elastic blades have a stress curve comprised between the minimum and maximum stress curves of Table A, and in that the elastic blades are brazed to the tube or linked to a support configured to be added onto the tube.

Alternatively, but optionally, the assembly according to the invention may further comprise the following features:
  the material(s) of the elastic blades has/have a Young's modulus at 20° C. comprised between 180,000 MPa and 250,000 MPa,
  the elastic blades are made of forged inco718 or sheet metal (DMD0424),
  the thickness of the elastic blades is comprised between 0.5 mm and 1.5 mm, preferably between 0.7 mm and 0.9 mm,
  the orthogonal cross-section length at rest of the central bracket is 12 mm to 30 mm greater than the width of the longitudinal cavity of the hollow arm of the casing,
  the width of the elastic blades is comprised between 30 mm and 50 mm,
  the central bracket is placed in a position substantially equidistant from both ends of the tube;

the assembly comprises two brackets, each comprising two elastic blades, the first bracket being disposed in a position distant from one of the ends by substantially one third of the distance separating the ends, and the second bracket being disposed in a position distant from the end by substantially two thirds of the distance separating the ends.

The invention also relates to a turbomachine comprising an assembly as described above.

The invention also relates to a method for assembling an assembly as described above, the method comprising the steps of:

compressing the elastic blades of the central bracket until plasticization of said blades, and passing the plasticized elastic blades of the central bracket through an opening of the longitudinal cavity of the hollow arm of the casing.

SHORT DESCRIPTION OF THE FIGURES

Figure 2:
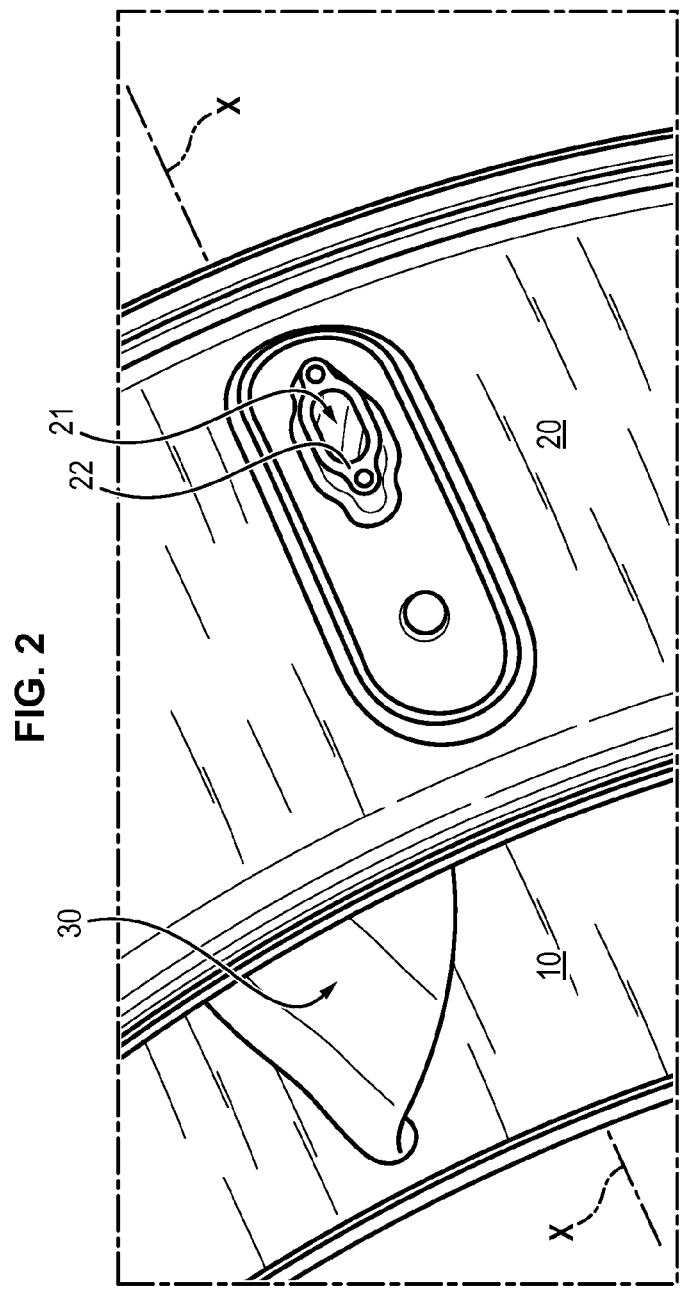
Figure 3:
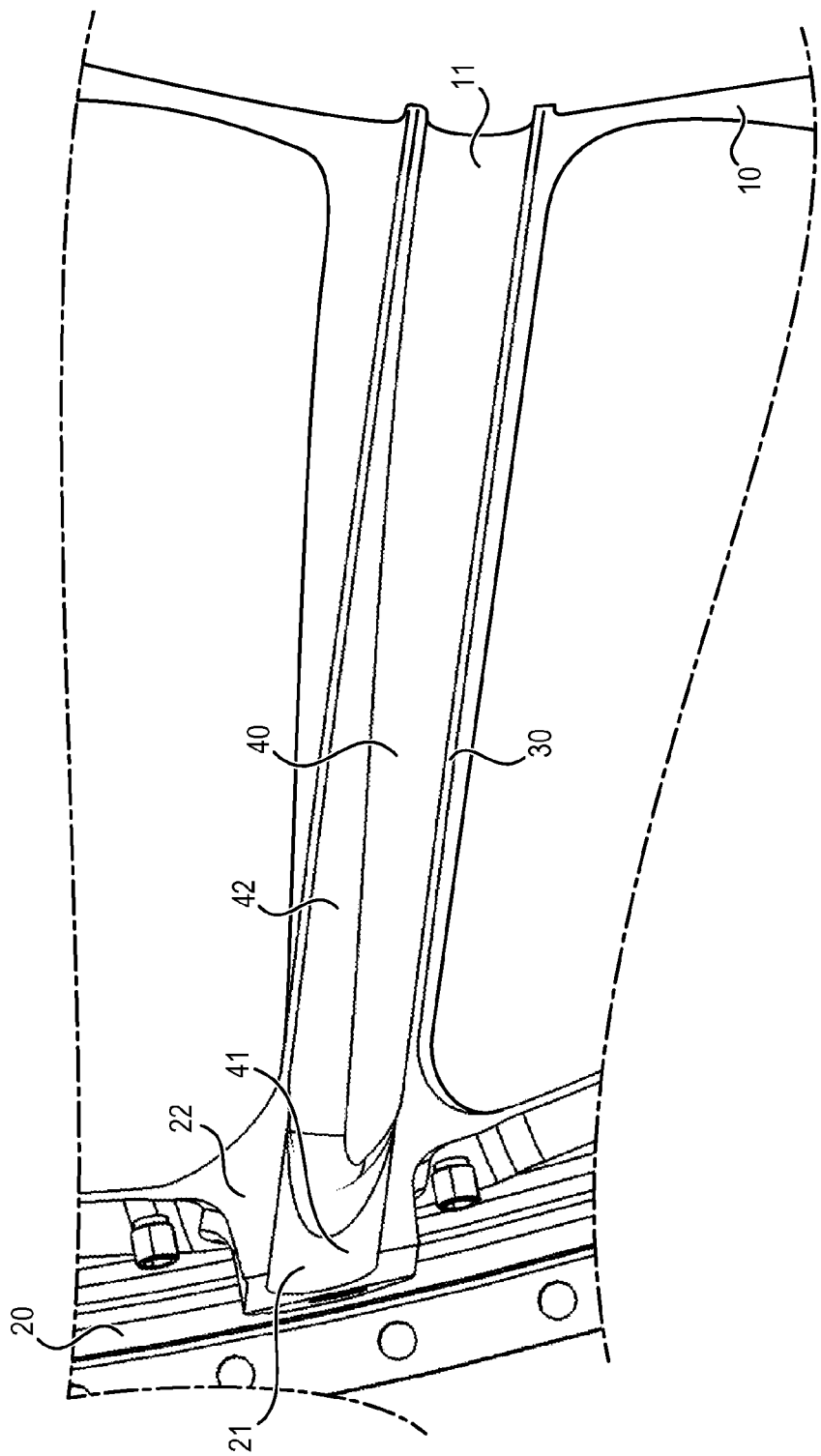
Figure 4:
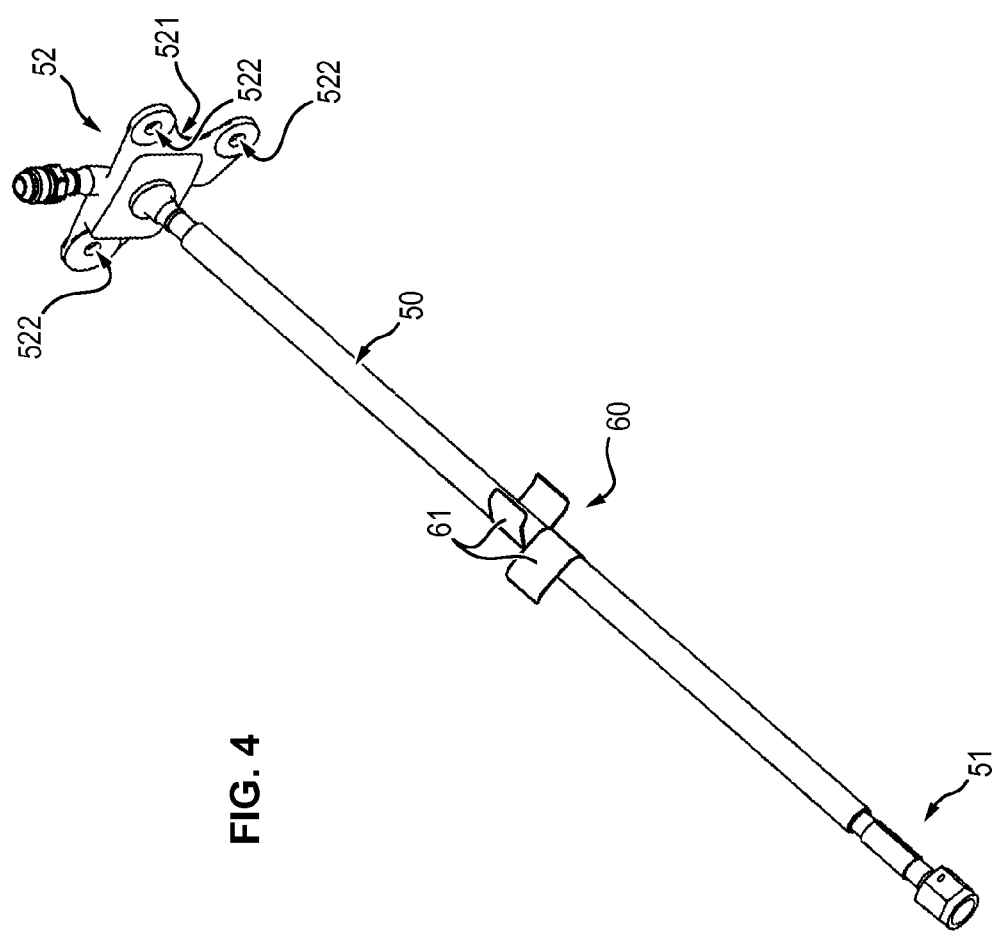
Figure 5:
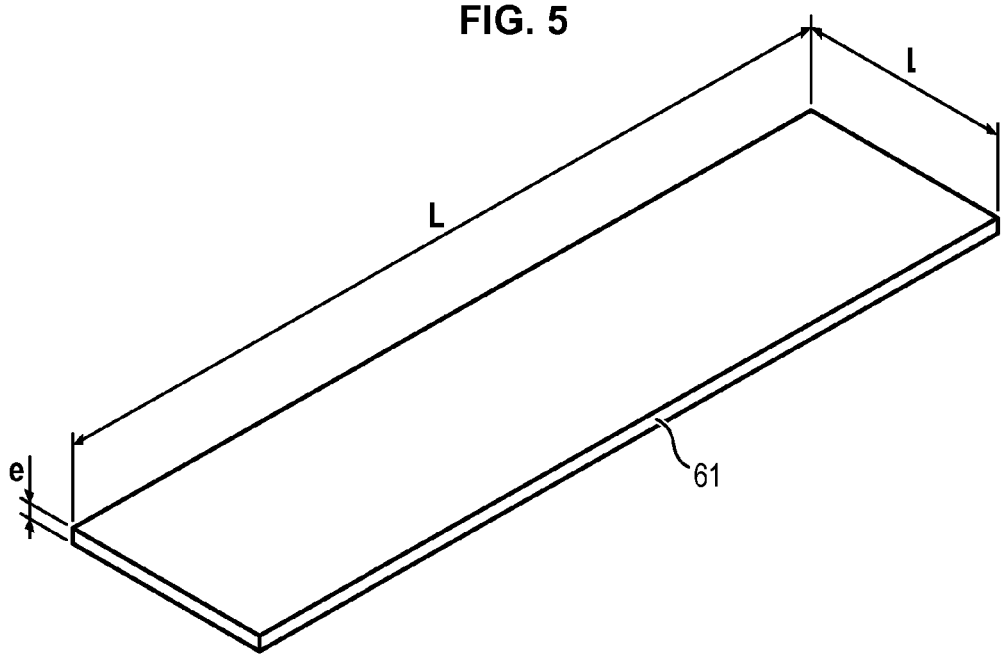
Figure 6:
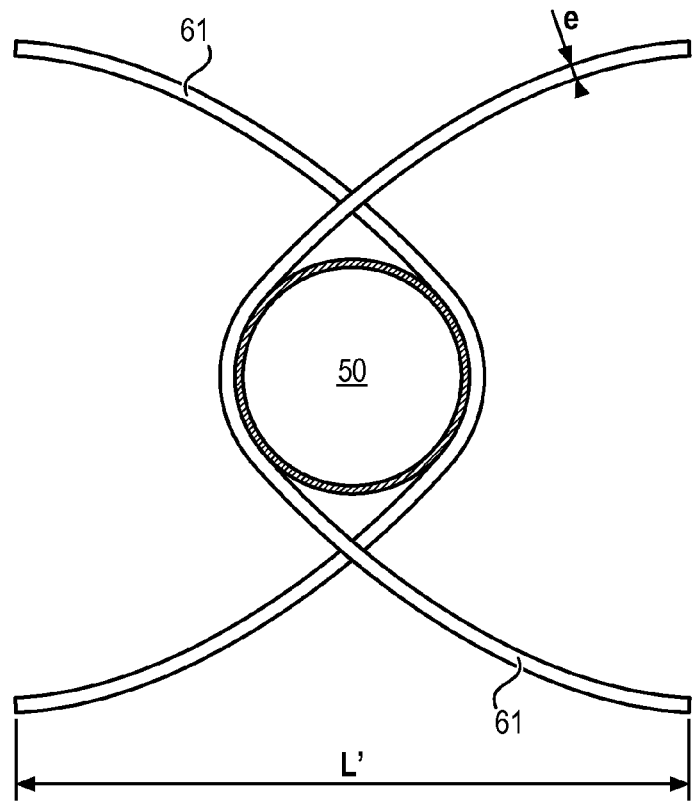
Figure 7:
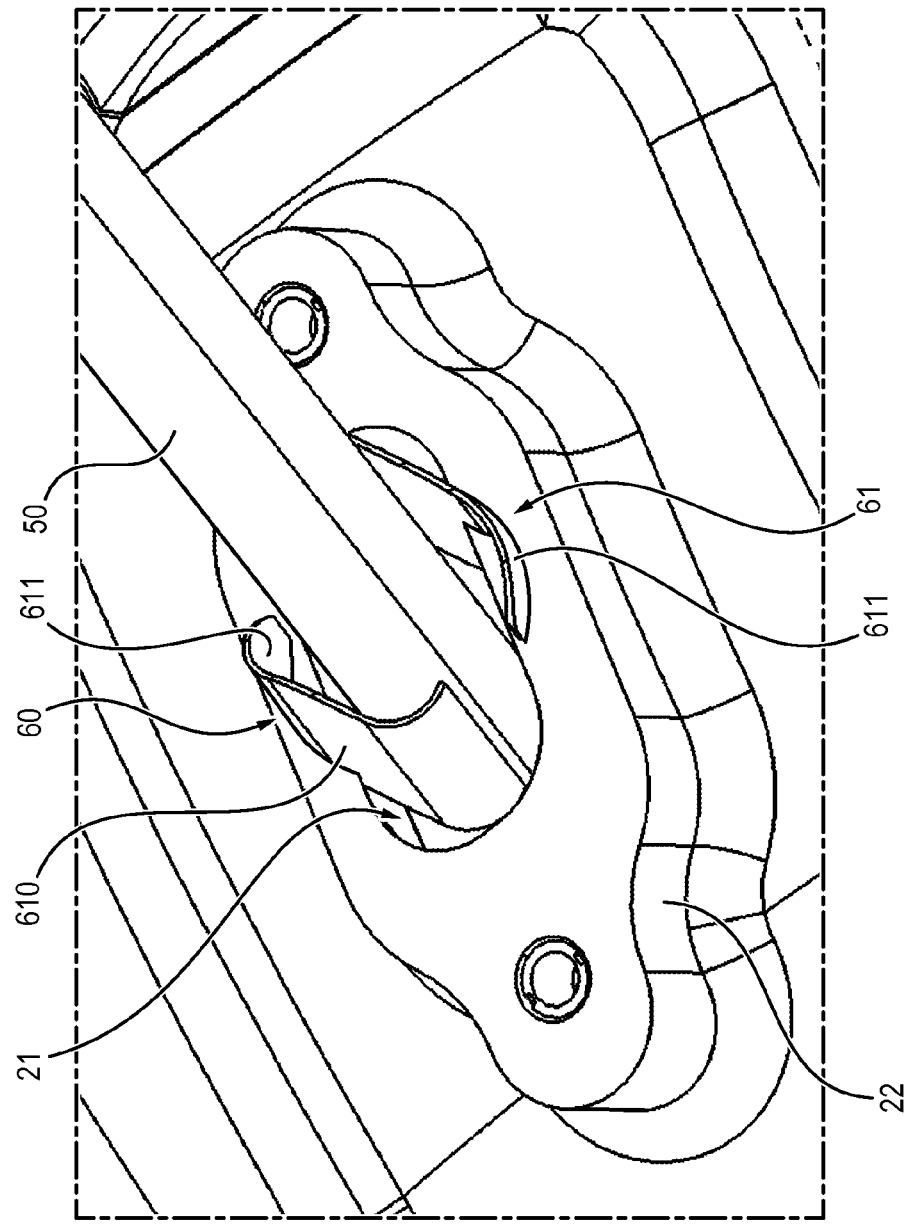
Figure 8:
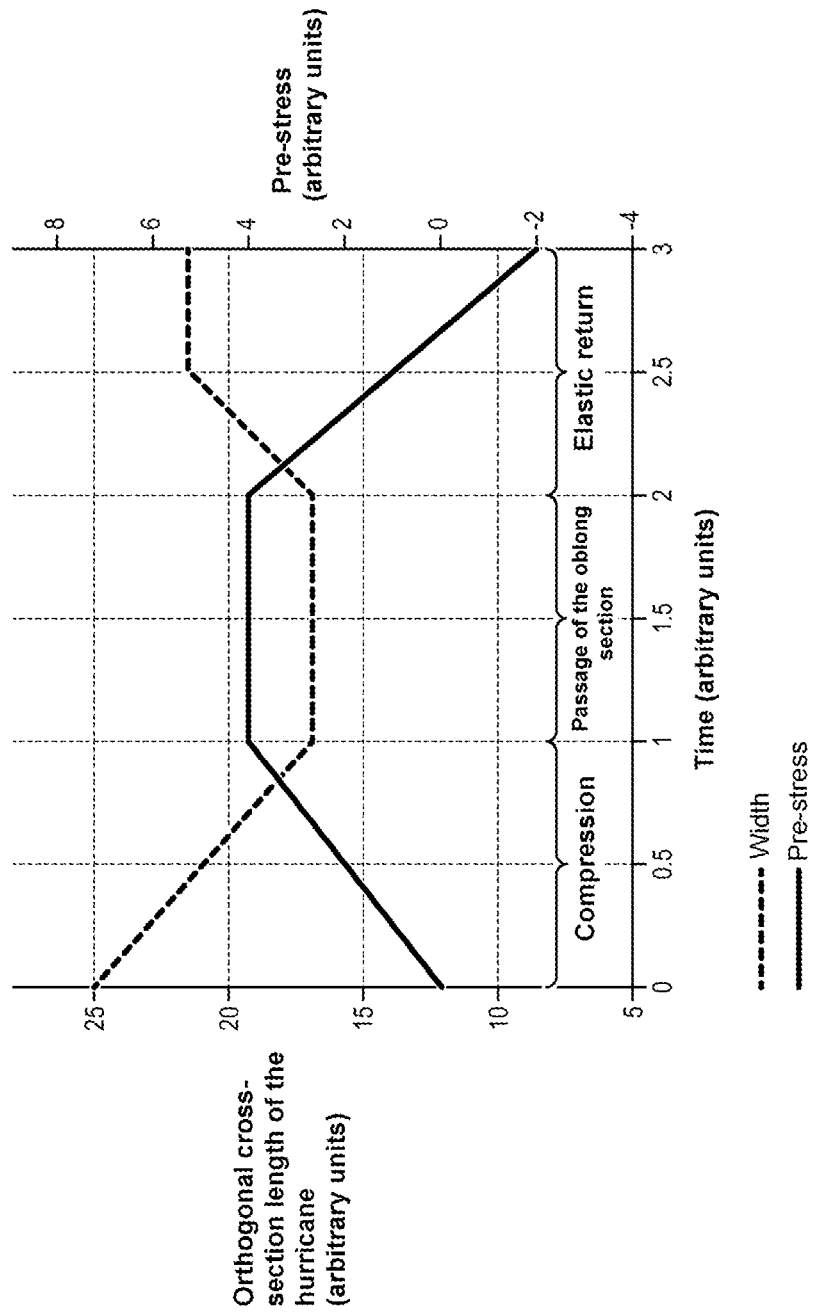
Figure 9:
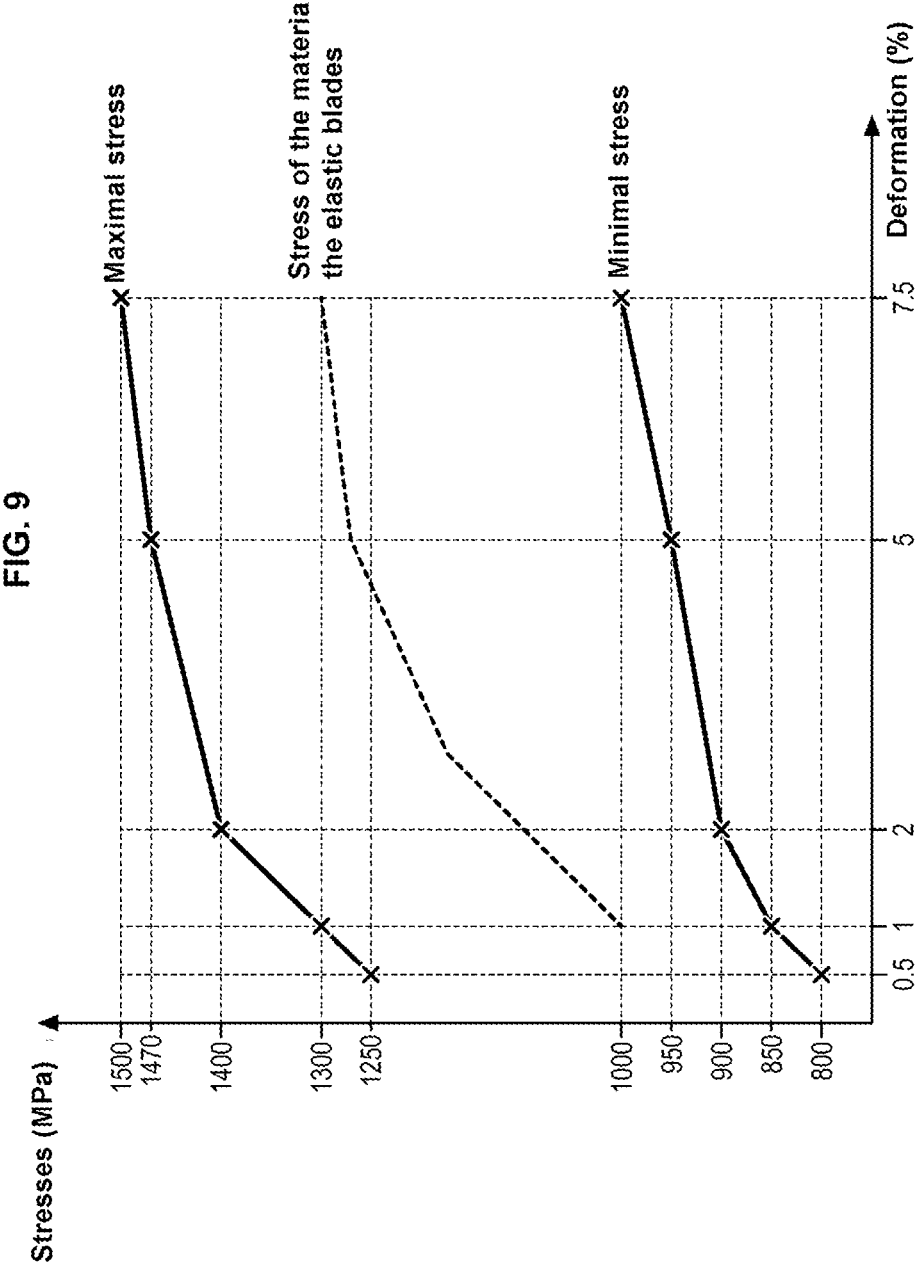

Other features, objects and advantages of the present invention will become apparent upon reading the following detailed description and in relation to the appended drawings given by way of non-limiting example and in which:

FIG. 1, already described, illustrates a turbomachine assembly comprising an auxiliary tube without central bracket, FIG. 2 illustrates a portion of a turbomachine assembly comprising an inner hub and an outer shroud that are connected by arms, FIG. 3 is a sectional view of the turbomachine assembly portion illustrated in FIG. 2, FIG. 4 illustrates a turbomachine assembly portion comprising an auxiliary tube provided with a "hurricane"-type central bracket;

FIG. 5 illustrates the main dimensions of an elastic blade of a "hurricane"-type central bracket, FIG. 6 illustrates a cross-section of a "hurricane"-type central bracket added onto an auxiliary tube along a plane orthogonal to the main direction of said tube, FIG. 7 illustrates the blocking of the "hurricane"-type central bracket at rest at the inlet of the oblong section of the longitudinal cavity of the hollow casing arm during the insertion of the auxiliary tube inside said cavity, FIG. 8 illustrates the diagram of the pre-stresses experienced by the hurricane bracket during the assembly method, and FIG. 9 illustrates the minimum and maximum stress curves between which is comprised the stress curve of the material(s) of the elastic blades of the central bracket.

DETAILED DESCRIPTION OF THE INVENTION

Referring to the figures, there will now be described a turbomachine assembly which comprises an inner hub 10 and an outer shroud 20, each of annular shape, and extending about an axis X-X of the turbomachine.

In the turbomachine, the described assembly can be placed at any location. For example, it may be downstream of the low-pressure turbine.

With reference to FIG. 2, the outer shroud 20 extends around and away from the inner hub 10. The outer shroud 20 thus has a diameter larger than the inner hub 10. The outer shroud 20 and the inner hub 10 are moreover concentric.

The inner hub 10 and the outer shroud 20 are connected by an assembly of arms 30 extending radially with respect to the X-X axis.

With reference to FIG. 3, each of the arms 30 is hollow and comprises a longitudinal cavity 40 that opens into the inner hub 10 through a first opening 11 and onto the outer shroud 20 via a boss 22 provided with a second opening 21.

The assembly may also comprise an auxiliary tube 50 illustrated in FIG. 4, configured to convey a fluid such as air, oil, or oiled air. The tube 50 is also configured to extend into the longitudinal cavity 40.

In this configuration, a first tube end 51 passes through the first opening 11 so that it can be connected to the inner hub 10, for example by bolting. In addition, the tube 50 extends out of the outer shroud 20 through the second opening 21 by a second end 52 which may, for example, take the appearance of a bend. The second end 52 may, for example, further comprise a flange 521 provided with peripheral holes 522 to allow a screw connection on the boss 22 of the outer shroud 20.

In this configuration, the two ends of the tube 51, 52 are therefore secured respectively to the inner hub 10 and to the outer shroud 20.

In this configuration, the tube 50 extends within the longitudinal cavity 40 without the outer surface of the tube 50 being in contact with a wall 42 of the longitudinal cavity 40. Thus, the tube 50 is able to vibrate during the operation of the turbomachine. These vibrations can reach the natural frequencies of the tube 50 which can therefore come into resonance and induce a rapid fatigue until break.

Therefore, the assembly may further comprise a central bracket 60 added onto the tube 50. The central bracket 60 may be added by direct brazing on the tube 50 or via a support itself configured to be added onto the tube 50.

As illustrated in FIG. 5, the central bracket 60 comprises two elastic blades 61 of a generally rectangular shape and having a length L, a width 1 and a thickness e.

As can be seen in FIG. 4, the elastic blades 61 wrap the tube 50. A cross-section along a plane orthogonal to the main direction of the tube 50 of the tube/elastic blade assembly is seen in FIG. 6. As can be seen more precisely in FIG. 7, each blade 61 comprises a flattened section 610 from which extend two curved tabs 611. Each of the blades 61 then has a U shape. Once it is disposed on the tube 50, the tube 50 extends into the recess of the U shapes formed by each of the blades 61.

In a preferred manner, the central bracket 60 comprises two complementary elastic blades 61 disposed facing one another and successively along the main direction of the tube 50. The central bracket 60 thus has a generally double U-shape, the tube 50 extending in the successive recesses of the two complementary elastic blades 61. The orthogonal cross-section length L' of the hurricane bracket 60 is also illustrated in FIG. 6, and corresponds to the distance separating the ends facing the complementary elastic blades 61. The double U-shaped structure of the bracket 60 recalling the shape of a cyclone, the term "hurricane" is used to designate such a central bracket 60.

The hurricane bracket 60 is therefore configured, when the tube 50 is inserted into the longitudinal cavity 40 of the hollow casing arm 30, to exert sufficient pressure on the walls 42 of said cavity 40 in order to prevent the vibrations of the tube 50 during the operation of the turbomachine. In this respect, it is known to place the hurricane bracket 60 in a position substantially equidistant from the ends 51, 52 of the tube 50, so as to maintain the central portion of the tube 50.

Alternatively, the central bracket 60 comprises two pairs of two elastic blades 61 forming two hurricane brackets 60. In this case, the first hurricane bracket 60 may be disposed in a position distant from one of the ends 51, 52 by substantially one third of the distance separating the ends 51, 52. The second hurricane bracket 60 is then disposed in a position distant from the end 51, 52 by substantially two thirds of the distance separating the ends 51, 52.

As will be understood in the light of what has been described above, the hurricane bracket 60 is added onto the tube 50 before the tube 50 is disposed inside the central cavity 40.

However, as shown in FIG. 7, the dimensions of the hurricane bracket 60 are such that the passage of the tube portion 50 carrying the hurricane bracket 60 through the second opening 21 of the longitudinal cavity 40 is made impossible.

In this regard, a method for assembling the previously described assembly comprises a step of compressing the hurricane bracket 60 to the passage of the second opening 21 of the longitudinal cavity 40, until plasticization of the bracket 60, so as to allow the entire tube 50 to extend within the longitudinal cavity 40 of the hollow casing arm 30.

As can be seen in FIG. 3, the longitudinal cavity portion 40 located near the second opening 21, called oblong section 41, has a width that is smaller than the remainder of the longitudinal cavity 40. Consequently, the hurricane bracket 60 is held in compression as long as the entire hurricane bracket 60 has not exceeded the oblong section 41. Subsequently, the hurricane bracket 60 relaxes and exerts pressure on the walls 42 of the longitudinal cavity 40.

FIG. 8 represents the diagram of the pre-stresses experienced by the hurricane bracket 60 during an assembly method. There are three pre-stress steps as a function of the insertion time of the tube 50 within the longitudinal cavity.

During a first step, the hurricane bracket 60 is compressed by mechanical means such as a clamp, or manually, so as to reduce the orthogonal cross-section length L' of the hurricane bracket 60 until it reaches the oblong width 41. This compression causes the plasticization of the hurricane bracket 60.

During a second step, the hurricane bracket 60 passes the oblong section 41, and the orthogonal cross-section length L' of the hurricane bracket 60 is kept constant substantially equal to the oblong width 41.

During a last step, the hurricane bracket 60 extends again by elastic return phenomenon, until reaching an orthogonal cross-section length substantially equivalent to the width of the longitudinal cavity 40 and thus exerting a pressure on the walls 42 of said cavity 40.

Subsequently, the tube ends 51, 52 are respectively fixed to the inner hub 10 and to the outer shroud 20.

In order to optimize the operation of the hurricane bracket 60 previously described, it is possible to design elastic blades of particular dimensions.

In this respect, the orthogonal cross-section length L', the width 1, and the thickness e of the elastic blades 61 have been dimensioned.

Regarding the thickness e, the dimensioning meets two opposite constraints:
the thickness e must be as large as possible in order to increase the natural frequency of the tube 50, and
the thickness e must be as small as possible in order to facilitate the mounting of the assembly, in particular during the passage of the hurricane bracket 60 at the oblong section 41.

In this respect, the Applicant has found that an optimum thickness e is comprised between 0.5 and 1.0 mm, preferably between 0.7 and 0.9 mm, and even more preferably is equal to 0.7 mm.

Regarding the width 1 of the elastic blades 61, the dimensioning must also meet mounting constraints. To do so, the Applicant has found that a total width of the optimal hurricane bracket 60 (i.e. by summing the successive widths 1 of the contiguous elastic blades 61) is comprised between 30 mm and 50 mm.

The last bracket dimension 60 is the orthogonal cross-section length L' at rest. The Applicant has found that an orthogonal cross-section length L' at optimal rest is comprised between the width of the longitudinal cavity 40 to which 6 mm are added on each side of the cavity 40, and the width of the longitudinal cavity 40 to which 15 mm are added on each side of the cavity.

In order to optimize the hurricane bracket 60 previously described, it is also possible to provide for elastic blades 61 made of a material having particular properties.

The material must be such that the plasticization of the elastic blades 61 is sufficient for the passage of the oblong section 41 so that the elastic return is greater than the difference in width between the oblong section 41 and the longitudinal cavity 40 of the arm 30. For this, the Applicant has found that an optimal material has a Young's modulus at 20° C. comprised between 180,000 MPa and 250,000 MPa.

Furthermore, the elastic blades 61 may comprise one or more material(s) having the stress-strain characteristics according to the following Table A:

TABLE A

| Deformation (%) | Minimal stress associated (MPa) | Maximal stress associated (MPa) |
| --- | --- | --- |
| 0.5 | 800 | 1250 |
| 1 | 850 | 1300 |
| 2 | 900 | 1400 |
| 5 | 950 | 1470 |
| 7.5 | 1000 | 1500 |

As illustrated in FIG. 9, the material(s) of the elastic blades 61 may be such that said elastic blades 61 have a stress curve comprised between the minimum and maximum stress curves of Table A.

These measurements are carried out on tensile test benches well known to those skilled in the art. By way of non-limiting example, these tests may be carried out on a tensile machine using test pieces comprising a material to be tested.

The previously described assembly therefore offers the advantage of reducing the resonance vibrations of the auxiliary tube 50 by proposing a hurricane bracket 60 whose elastic return after plasticization is sufficient to ensure permanent contact with the walls 42 of the longitudinal cavity 30 of the hollow casing arms 30.

The properties of the elastic blades 61 of the hurricane bracket 60 previously described have a compromise between:
a dynamic status that requires the thickest hurricane bracket 60 possible, and
an ease of mounting that requires the thinnest hurricane bracket 60 possible.

Finally, it is possible to provide for a deburring or a slight radius on the hurricane bracket 60 so as to minimize the scratches on the walls 42 of the longitudinal cavity 40 during insertion of the tube 50.

The invention claimed is:

1. A turbomachine assembly comprising:
 a casing comprising:
  an inner hub,
  an outer shroud extending around and away from the inner hub,
  a hollow arm provided with a longitudinal cavity defined by a wall, the hollow arm connecting the inner hub and the outer shroud,
 a tube configured to extend inside the longitudinal cavity, wherein the tube comprises a central bracket comprising two elastic blades and being configured to exert a pressure on the wall when the tube is extended within the longitudinal cavity
 wherein a constitutive material of the elastic blades has stress strain characteristics such that when the constitutive material has a deformation between 0.5% and 7.5%, then the constitutive material has a minimum associated stress between 800 MPa and 1000 MPa and a maximum associated stress between 1250 MPa and 1500 MPa, wherein the elastic blades are brazed to the tube or linked to a support configured to be added onto the tube, and wherein each elastic blade has a U shape and the tube extends into a recess of the U shape.

2. The assembly according to claim 1, wherein the constitutive material has a Young's modulus at 20° C. comprised between 180,000 MPa and 250,000 MPa.

3. The assembly according to claim 1, wherein the elastic blades are made of sheet metal.

4. The assembly according to claim 1, wherein a thickness of the elastic blades is comprised between 0.5 mm and 1.5 mm.

5. The assembly according to claim 1, wherein a distance separating facing ends of the elastic blades that is taken in an orthogonal cross-section of the central bracket at rest, is 12 mm to 30 mm greater than a width of the longitudinal cavity of the hollow arm of the casing.

6. The assembly according to claim 1, wherein a width of the elastic blades is comprised between 30 mm and 50 mm.

7. The assembly according to claim 1, wherein the tube has two ends, the central bracket being placed in a position substantially equidistant from the two ends of the tube.

8. The assembly according to claim 1, wherein the tube has a first end and a second end, the assembly further comprising an additional bracket comprising two additional elastic blades, the central bracket being disposed in a position distant from one of the first end and the second end by substantially one third of a distance separating the first end and the second end, and the additional bracket being disposed in a position distant from the other of the first end and the second end by substantially two thirds of the distance separating the first end and the second end.

9. A turbomachine comprising an assembly according to claim 1.

10. A method for assembling a turbomachine assembly comprising:
 a casing comprising:
  an inner hub,
  an outer shroud extending around and away from the inner hub,
  a hollow arm provided with a longitudinal cavity defined by a wall, the hollow arm connecting the inner hub and the outer shroud,
 a tube configured to extend inside the longitudinal cavity, wherein the tube comprises a central bracket comprising two elastic blades and being configured to exert a pressure on the wall when the tube is extended within the longitudinal cavity;
 wherein a constitutive material of the elastic blades has stress strain characteristics such that when the constitutive material has a deformation between 0.5% and 7.5%, then the constitutive material has a minimum associated stress between 800 MPa and 1000 MPa and a maximum associated stress between 1250 MPa and 1500 MPa, wherein the elastic blades are brazed to the tube or linked to a support configured to be added onto the tube;
 the method comprising the steps of:
 compressing the elastic blades of the central bracket until plasticization of said elastic blades, and
 passing the plasticized elastic blades of the central bracket through an opening of the longitudinal cavity of the hollow arm of the casing.

11. A turbomachine assembly comprising:
 a casing comprising:
  an inner hub,
  an outer shroud extending around and away from the inner hub,
  a hollow arm provided with a longitudinal cavity defined by a wall, the hollow arm connecting the inner hub and the outer shroud,
 a tube configured to extend inside the longitudinal cavity and comprises a central bracket comprising two elastic blades and being configured to exert a pressure on the wall when the tube is extended within the longitudinal cavity
 wherein a constitutive material of the elastic blades has stress strain characteristics such that when the constitutive material has a deformation between 0.5% and 7.5%, then the constitutive material has a minimum associated stress between 800 MPa and 1000 MPa and a maximum associated stress between 1250 MPa and 1500 MPa, wherein the elastic blades are brazed to the tube or linked to a support configured to be added onto the tube, and wherein the elastic blades are disposed successively along a main direction of the tube, and each elastic blade has a U shape and the tube extends into a recess of the U shape.

* * * * *